US012716282B2

(12) United States Patent
Mitchell et al.

(10) Patent No.: US 12,716,282 B2
(45) Date of Patent: Aug. 25, 2026

(54) CAP FOR DOOR HINGE

(71) Applicant: Kason Industries, Inc., Newnan, GA (US)

(72) Inventors: Brett A. Mitchell, Newnan, GA (US); Jeffrey E. Underwood, Grantville, GA (US)

(73) Assignee: Kason Industries, Inc., Newnan, GA (US)

( * ) Notice: Subject to any disclaimer, the term of this patent is extended or adjusted under 35 U.S.C. 154(b) by 9 days.

(21) Appl. No.: 19/057,426

(22) Filed: Feb. 19, 2025

(65) Prior Publication Data

US 2026/0243120 A1 Aug. 20, 2026

(51) Int. Cl.

*E05D 11/00* (2006.01)
*E05D 9/00* (2006.01)
*E05D 7/10* (2006.01)

(52) U.S. Cl.

CPC .......... *E05D 11/0054* (2013.01); *E05D 9/005* (2013.01); *E05D 7/1044* (2013.01)

(58) Field of Classification Search

CPC ................. E05D 11/02; E05D 11/0054; E05D 2011/0063; E05D 2011/0072; E05D 9/005; E05D 7/1044

See application file for complete search history.

(56) References Cited

U.S. PATENT DOCUMENTS

| | | | | | |
|---|---|---|---|---|---|
| 582,359 | A * | 5/1897 | Look | F16L 5/00 | 24/713.8 |
| 1,469,880 | A * | 10/1923 | Bowden | B60C 29/066 | 138/89.4 |
| 3,015,126 | A * | 1/1962 | Ahlgren | E05D 5/127 | 16/385 |
| 5,463,795 | A * | 11/1995 | Carlson | E05D 11/00 | 16/385 |
| 5,991,975 | A * | 11/1999 | Baer | E05D 7/009 | 16/354 |
| 7,584,523 | B1 * | 9/2009 | Finkelstein | E05D 7/0423 | 16/271 |
| 7,945,996 | B2 * | 5/2011 | Gunderson | E05F 1/063 | 16/303 |
| 8,191,205 | B2 * | 6/2012 | Forrest | E05D 11/06 | 16/386 |
| 9,140,045 | B1 * | 9/2015 | Finkelstein | E05D 7/04 | |
| 11,156,026 | B1 * | 10/2021 | Rowland | E05D 5/04 | |
| D975,527 | S * | 1/2023 | Ye | D8/378 | |

(Continued)

*Primary Examiner* — Chuck Y Mah

(74) *Attorney, Agent, or Firm* — Baker, Donelson, Bearman, Caldwell & Berkowitz, PC

(57) ABSTRACT

A hinge which includes a mounting flange assembly pivotally coupled to a strap assembly. The strap assembly includes a strap extending from a cylinder portion having a coupling end with a vertically extending octagonal channel therethrough. The hinge also includes an elongated cam follower having a lower cam follower portion and lower cam follower with an upper cam follower portion having a round exterior surface. A cap seals the top opening of the channel. The cap has an annular angle-corrugated shaped sidewall extending to a circular top plate. The angle-corrugated shaped sidewall has eight equally spaced projections corresponding to the eight internal corners of the octagonal channel to resist the relative movement or deflection of or between the strap and the flange.

12 Claims, 5 Drawing Sheets

(56) References Cited

U.S. PATENT DOCUMENTS

| | | | | |
|---|---|---|---|---|
| 11,542,737 | B1 * | 1/2023 | Shields | E05D 3/122 |
| D1,055,683 | S * | 12/2024 | Jin | D8/378 |
| 2007/0000090 | A1 * | 1/2007 | Wu | E05F 1/1215<br>16/299 |
| 2007/0151077 | A1 * | 7/2007 | Wei | E05F 1/00<br>16/320 |
| 2013/0305488 | A1 * | 11/2013 | Dodge | E05D 7/0423<br>16/245 |
| 2016/0060932 | A1 * | 3/2016 | Stuart | E05F 5/02<br>16/297 |
| 2017/0146282 | A1 * | 5/2017 | Dodge | E05D 3/02 |

* cited by examiner

CAP FOR DOOR HINGE

TECHNICAL FIELD

This invention relates generally to door hinges, and more particularly to the cap of a hinges used for commercial refrigerator and freezer doors.

BACKGROUND OF INVENTION

Walk-in cold rooms, such as walk-in coolers, freezers, or other refrigerated environments, are common in various industries, including supermarkets and grocery stores, commercial kitchens, and other food service facilities. They typically have one or more access doors for entry and exit.

These doors are heavy and thus a common problem that may occur over time is that the door must be removed for maintenance to the door or the floor beneath the door. Thus, lift-off type hinges have been designed which enable the door to be removed by simply lifting the door to disengage the hinge.

A typical lift-off type hinge is shown in U.S. Pat. No. 9,416,574 which is incorporated herein by reference in its entirety. The hinge 10 includes a mounting flange assembly 12 pivotally coupled to a strap assembly 15. The strap assembly includes a strap 31 extending from a cylinder portion 32. The cylindrical portion 32 includes a coupling end 34 with a vertically extending octagonal channel 35 therethrough. The hinge also includes an elongated cam follower 40 having a lower cam follower portion 41 with an octagonal exterior surface 43 terminating at a circumferential ledge or shoulder 44 positioned to abut and bear against the centrally positioned annular ridge of the coupling end. An upper cam follower portion with a cylindrical spring housing 42 mates with the lower cam follower portion. The upper cam follower portion 42 is generally cylindrical with a round exterior surface 55. The upper cam follower portion 42 houses a compression spring 62 positioned concentrically about a shoulder rod 25. As such, the upper cam follower portion 42 may be considered to be a cam-spring assembly, or a portion of a cam-spring assembly. A cap 38 is positioned partially within the octagonal channel 35 to prevent dirt from entering the octagonal channel. The cap 38 of the prior art has a cylindrical wall that concentrically resides between the octagonal channel and the round exterior surface of the upper cam follower portion.

The problem with these hinges is that there is a certain amount of clearance between the strap and flange assembly, specifically between the cylindrical upper cam follower portion 42 and the octagonal channel 35. This clearance leaves a space or gap for the strap to rotate slightly relative to the flange that can result in the occurrence of some door sag over time. It has been found that the cap 38 does not provide the support necessary to prevent this sagging of the door.

Accordingly, there is a need in the art for a hinge that will allow for the door to be lifted off easily, which does not promote door sag, and which properly aligns the hinge components when disassembled and subsequently reassembled. It is to the provision of such therefore that the present invention is primarily directed.

SUMMARY OF THE INVENTION

In a preferred form of the invention a hinge comprises a mounting flange assembly having a cam-spring assembly with a cylindrical spring housing, a strap assembly pivotally coupled to said mounting flange assembly, the strap assembly including a strap having at least one strap mounting hole and a coupling end having a longitudinally extending channel therein configured to receive the cylindrical spring housing, the channel having a polygon configuration with a select number of interior corners, and a cap having an angle-corrugated shaped sidewall extending from a top plate. The angle-corrugated shaped sidewall has a select number of projections equal in number to the select number of interior corners of the channel. The angle-corrugated shaped sidewall is positioned between and in contact with the cylindrical spring housing and the channel. With this construction, the proper alignment between the cylindrical spring housing and the channel is maintained by the angle-corrugated shaped sidewall of the cap.

DETAILED DESCRIPTION

Figure 1:
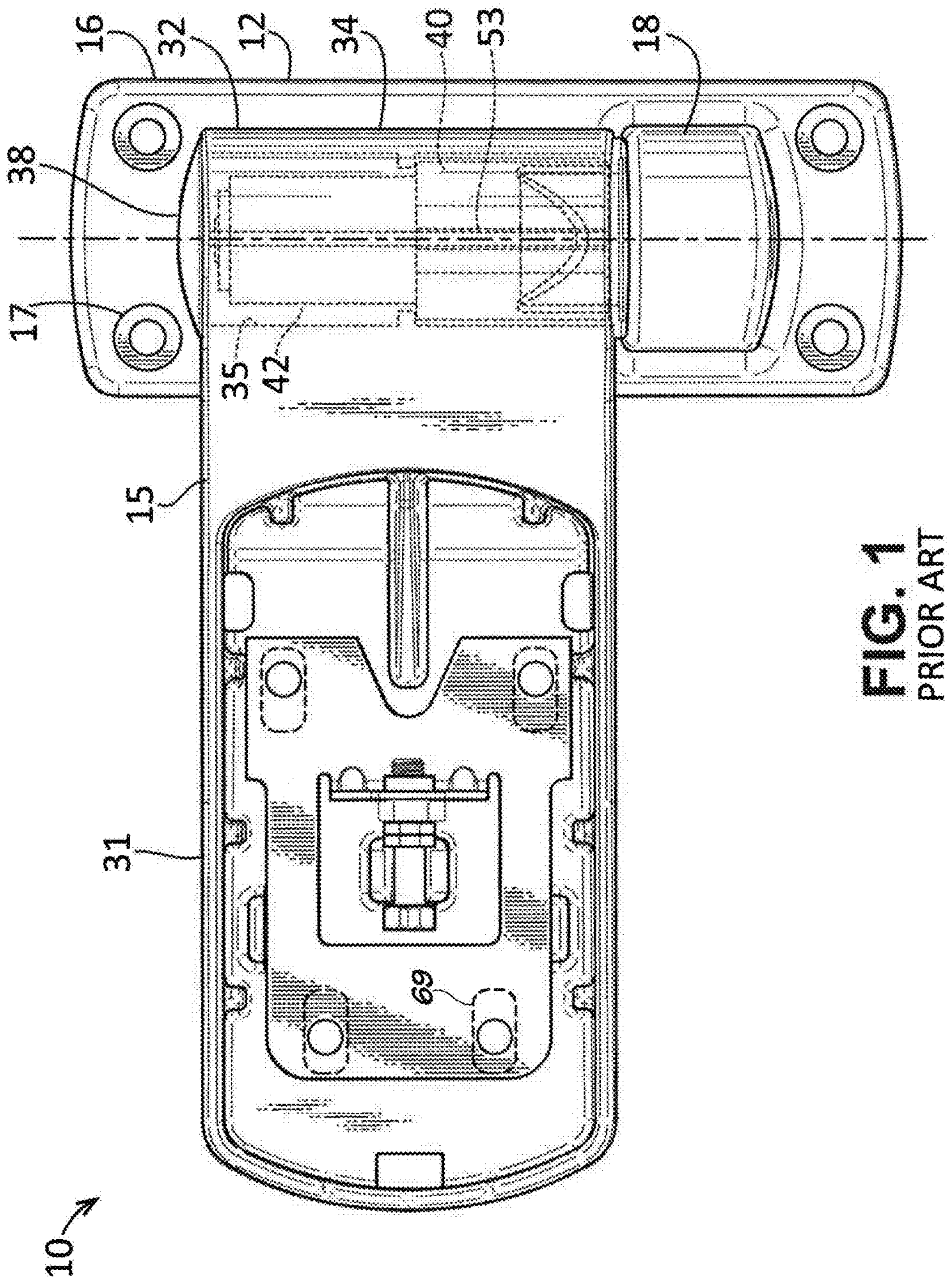
FIG. 1 PRIOR ART
FIG. 1 is a front view of a prior art hinge.
Figure 2:
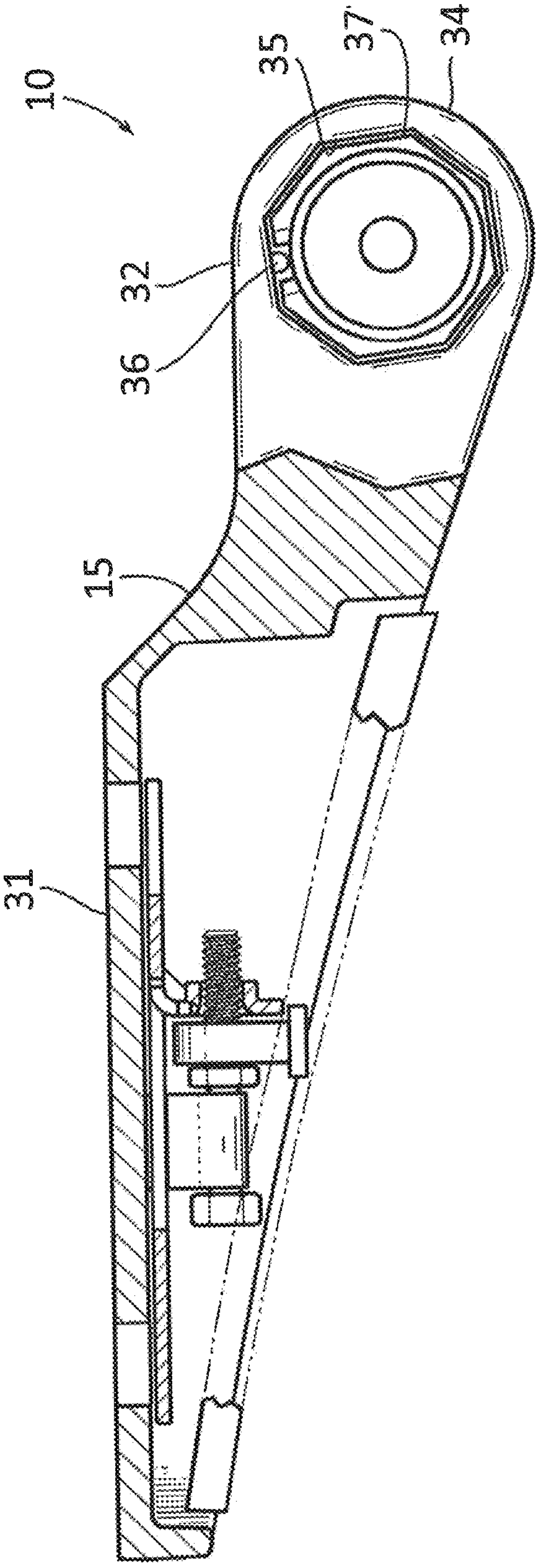
FIG. 2 PRIOR ART
FIG. 2 is a top view of the prior art hinge of FIG. 1, shown in partial cross-section.
Figure 3:
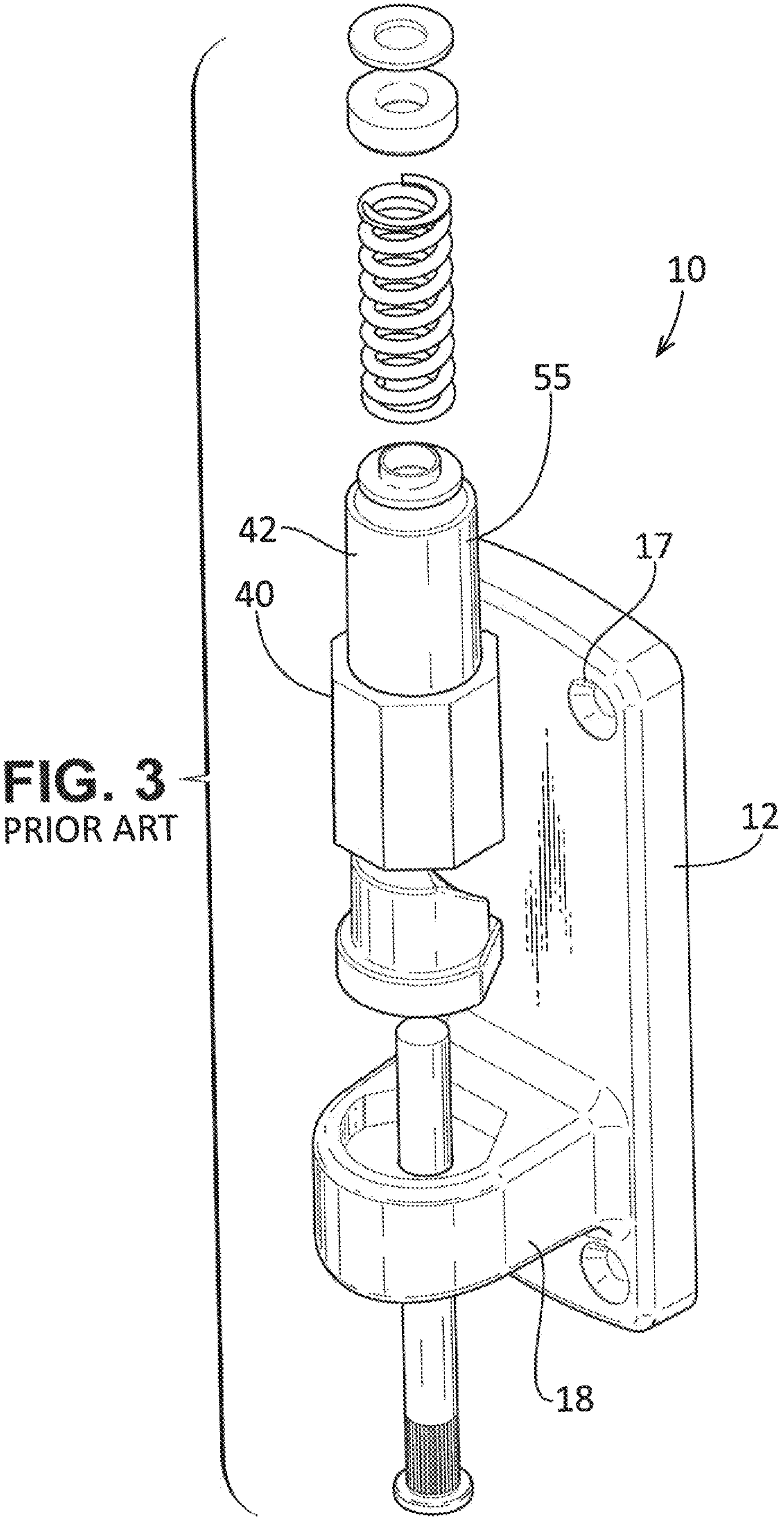
FIG. 3 PRIOR ART
FIG. 3 is an exploded view of a portion of the prior art hinge of FIG. 1.
Figure 4:
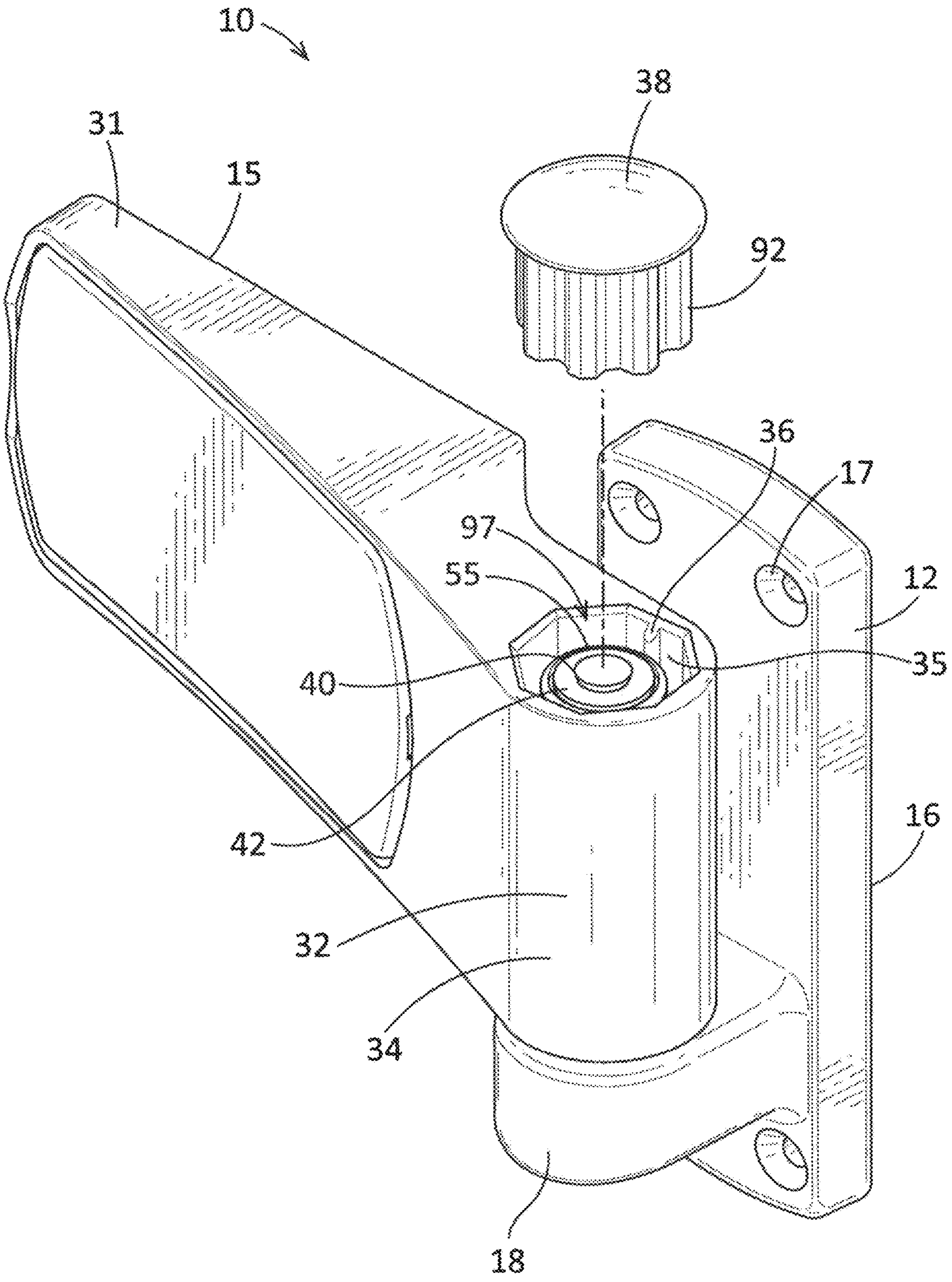
FIG. 4 is a partially exploded perspective view of a hinge embodying principles of the invention in a preferred form.
Figure 5:
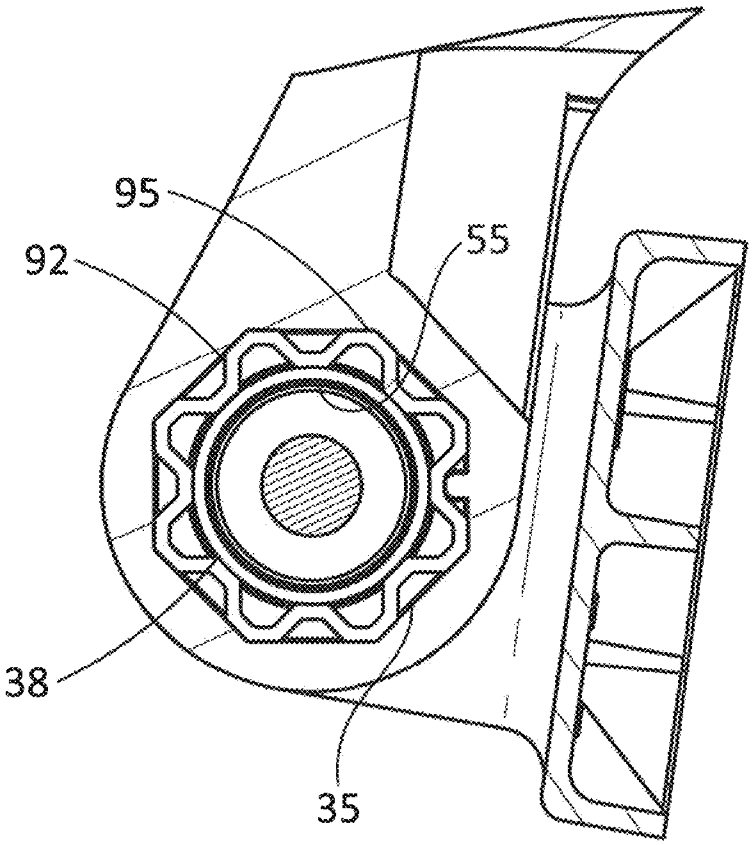
FIG. 5 is a partial cross-sectional, top view of a portion of the hinge of FIG. 4.
Figure 6:
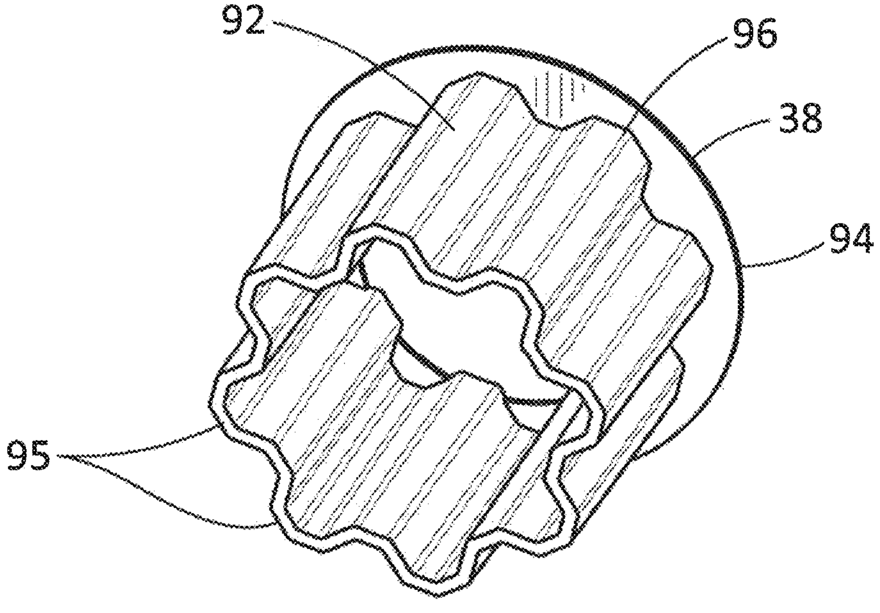
FIG. 6 is a perspective view of the cap of the hinge of FIG. 4.

With reference next to the drawings, there is shown a lift-off type anti-sag hinge 10 according to the present invention, referenced hereinafter simply as hinge 10. The hinge 10 includes a mounting flange assembly 12 pivotally coupled to a strap assembly 15. It is to be appreciated that the hinge 10 shown in the drawings is configured for use with a walk-in refrigerator or freezer door. The jamb and doors are well-known in the art and need not be disclosed further herein. It is to be further appreciated that the hinge 10, either alone or in combination with another hinge in accordance with the present invention, support a door (not shown) in the usual manner.

The mounting flange assembly 12 includes a metal mounting plate 16 having four mounting holes 17 therethrough adapted to receiving unshown mounting bolts or screws, and a metal lower hinge flange 18 extending perpendicularly from the mounting plate 16. As used throughout the entire disclosure herein, the terms screw and bolt are used interchangeably. The mounting flange assembly 12, as well as the other portions of the hinge 10, includes all the components recited in U.S. Pat. No. 9,416,574, except for those specifically recited as being different herein. Thus, the hinge 10 includes a cam follower 40 having an upper cam follower portion or spring housing 42 that is generally cylindrical with a round exterior surface 55. The upper cam follower portion 42 houses a compression spring positioned concentrically about a shoulder rod. As such, the upper cam follower portion 42 may be considered to be a cam-spring assembly, or a portion of a cam-spring assembly.

The strap assembly 15 includes a metal elongated strap 31 extending from a cylinder portion 32. The term cylinder portion 32 is meant to describe the enlarged casing located at the end of the strap and the encased bearings, spring, and cam, as described in more detail hereinafter. The term cylinder portion is not intended to be limited to a cylinder shape, as this portion or parts of this portion may be of many known shapes and are not necessarily cylindrical in shape as they may also be polygonal in shape.

The cylindrical portion 32 includes a coupling end 34 with a vertically extending octagonal channel 35 therethrough. The octagonal channel 35 includes eight internal sides 39 joined through eight internal corners 33. The cylindrical portion also houses the elongated cam follower as described in U.S. Pat. No. 9,416,574.

A cap 38 is pressed into and seals the top opening of the channel 35. The cap 38 has a ring-like or annular angle-corrugated or undulating shaped sidewall 92 extending to a circular top plate 94. The angle-corrugated shaped sidewall 92 has eight equally spaced, outwardly and radially extending high points, ridges, peaks, crests, or projections 95 corresponding to the eight internal corners 33 of the octagonal channel 35, i.e., the projections 95 are arranged in a circular or radial array. Preferably, each of the eight projections 95 has an elongated angular apex, corner edge or ridgeline 96 positioned in register with the interior corners 33 of the octagonal channel 35, i.e., the most outward or outboard part or portion of each projection terminates along a vertical, elongated corner, elongated point, or angle.

The cap 38 is made of a rigid plastic material to provide some pliability when inserting the cap 38 into the octagonal channel 35, yet the cap 38 provides a rigid structure within a space or gap 97 between the octagonal channel 35 and the round exterior surface 55 of the upper cam follower portion 42 to resist the relative movement or deflection of or between the strap and the flange. The cap's angle-corrugated shaped sidewall 92 may flex a small amount yet maintain a tight fit within the gap 97; therefore, the cap 38 provides a tight, zero clearance fit, yet is flexible enough to take up for tolerances within the space or gap 97 between the octagonal channel 35 and the round exterior surface 55 of the upper cam follower portion 42. This tight fit of the cap's angle-corrugated shaped sidewall 92 prevents the tilting or sagging movement between the strap and flange.

In use, the hinge 10 is mounted to the refrigerator or freezer door in the conventional manner as is well known in the art. The mounting plate 16 is secured to the jamb by the use of screws (not shown) that extend through the mounting plate mounting holes 17 and into the jamb. A conventional walk-in refrigerator or freezer door is similarly secured to the hinge 10 by four screws (not shown) that extend through the four unshown, conventional mounting holes of the strap. The cap 38 is then mounted to the strap assembly 15 so that the angle-corrugated shaped sidewall 92 extends between the octagonal channel 35 and the round exterior surface 55 of the upper cam follower portion 42.

It should be understood that the channel 35 of the cylindrical portion 32 is not required to include eight sides 39 and corners 33 with a corresponding number of projections 95 in the angle-corrugated shaped sidewall 92 of the cap 38. Any relatively small number of corresponding numbered corners 33 and projections 95 may be utilized with the hinge 10. The registering or meshing of the projection corners 96 against the channel interior corners 33 helps to maintain the cap in a proper position. Preferably, the channel 35 has regular polygon configuration wherein all sides and angles are equal, such as the octagonal shape shown in the preferred embodiment.

While this invention has been described in detail with particular reference to the preferred embodiments thereof and the best mode of practicing same, it will be understood that variations and modifications can be affected within the spirit and scope of the invention as described herein above and as set forth in the appended claims.

The invention claimed is:

1. A hinge comprising, a mounting flange assembly having a cam-spring assembly with a cylindrical spring housing;

a strap assembly pivotally coupled to said mounting flange assembly, said strap assembly including a strap having at least one strap mounting hole and a coupling end having a longitudinally extending channel therein configured to receive said cylindrical spring housing, said channel having a polygon configuration with a select number of interior corners, and a cap having an angle-corrugated shaped sidewall extending from a top plate, said angle-corrugated shaped sidewall having a select number of projections equal in number to said select number of interior corners of said channel, said angle-corrugated shaped sidewall being positioned between and in contact with said cylindrical spring housing and said channel, whereby the proper alignment between the cylindrical spring housing and the channel is maintained by the angle-corrugated shaped sidewall of the cap.

2. The hinge of claim 1 wherein said channel has an octagonal shape, and wherein said angle-corrugated shaped sidewall has eight projections.

3. The hinge of claim 1 wherein said each projection of said angle-corrugated shaped sidewall has an elongated angled apex.

4. The hinge of claim 1 wherein said cap angle-corrugated shaped sidewall is made of a rigid plastic.

5. A hinge comprising, a mounting flange assembly having a cam assembly including an upper portion with a cylindrical shape;

a strap assembly pivotally coupled to said mounting flange assembly, said strap assembly including a polygonal shaped channel in which is positioned said upper portion of said cam assembly, said polygonal shaped channel being defined by a select number of internal sides and internal corners, and a cap coupled to said strap assembly, said cap having an annular sidewall composed of a series of radially extending elongated projections equal in number to said select number of internal sides and internal corners, said annular sidewall being positioned between said cylindrical shaped upper portion of said cam assembly and said polygonal shaped channel.

6. The hinge of claim 5 wherein said channel has an octagonal shape, and wherein said cap has eight projections.

7. The hinge of claim 5 wherein said each projection has an elongated angled apex.

8. The hinge of claim 5 wherein said sidewall is made of a rigid plastic.

9. A hinge comprising, a mounting flange assembly having a cam assembly including an upper portion with a cylindrical shape;

a strap assembly pivotally coupled to said mounting flange assembly, said strap assembly including a channel positioned about said upper portion of said cam assembly to define a gap between said channel and said upper portion of said cam assembly, said channel being defined by a select number of internal corners, and a cap mountable to said strap assembly, said cap having an undulating sidewall having a radial array of peaks wherein each said peak is positioned within said gap in register with one said corner.

10. The hinge of claim 9 wherein said channel has an octagonal shape, and wherein said undulating sidewall of said cap has eight peaks.

11. The hinge of claim 9 wherein said each peak has an angled apex.

12. The hinge of claim 9 wherein said sidewall is made of a rigid plastic.

* * * * *